Nov. 4, 1952 J. B. BRENNAN 2,616,165
ELECTRODE FOR ELECTROLYTIC DEVICES
AND METHODS OF MAKING SAME
Filed Jan. 18, 1947

INVENTOR.
JOSEPH B. BRENNAN
BY
Bosworth + Sessions
ATTORNEYS

Patented Nov. 4, 1952

2,616,165

UNITED STATES PATENT OFFICE 2,616,165

ELECTRODE FOR ELECTROLYTIC DEVICES AND METHODS OF MAKING SAME

Joseph B. Brennan, Bratenahl, Ohio, assignor to Everett D. McCurdy, trustee

Application January 18, 1947, Serial No. 722,829

15 Claims. (Cl. 29—183)

This invention relates to electrolytic devices and more particularly to electrodes for electrolytic devices such as electrolytic condensers and similar devices embodying electrodes of film-forming metal, and storage batteries of the alkaline or Edison type. The general object of the invention is the provision of electrodes for such devices having large capacity per unit of volume, high efficiency, and long life and low cost.

In electrolytic devices of these types it is known that the capacity of the electrode is a function of the effective surface area of the electrode in contact with the electrolyte. According to the present invention, a large effective electrode area is obtained by providing a base made up of fine strands, fibers or filaments of non-conductive material, glass fibers, for example, having a large surface area as compared to their mass and volume. The fibers or filaments making up the base material are sheathed with thin conductive metallic coatings, which surround individual fibers or filaments or groups composed of several fibers or filaments. The very large surface area of the base material insures a correspondingly large area of metal. The coatings or sheaths adhere firmly to the underlying metal and are preferably continuous, resulting in good conductivity and durability. The electrodes are preferably in the form of thin porous mats of felted fibers, or of open mesh woven material; in either case the porosity is such that the electrolyte can permeate the electrodes. The coatings on the strands are substantially all in circuit with each other, thus insuring efficient utilization of the metal and resulting in a low resistance electrode.

Figure 1:
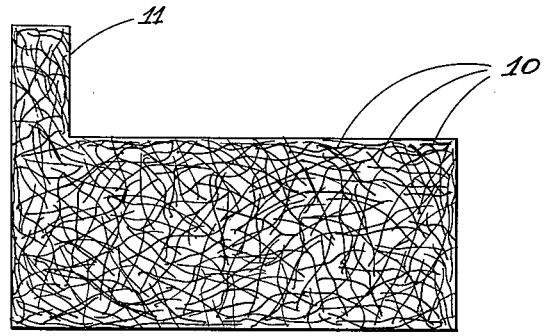
Figure 2:
Figure 3:
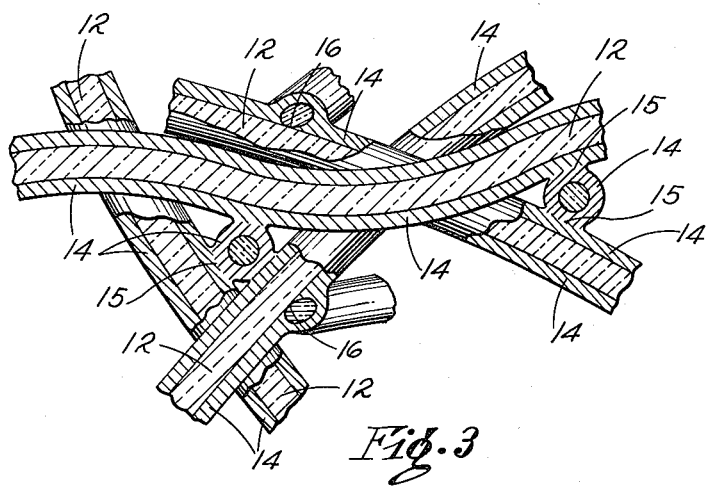

In the drawings, Figure 1 illustrates a plan view of an electrode made according to my invention; Figure 2 is a side elevation; and Figure 3 illustrates a small portion of the electrode of Figure 1 on a greatly enlarged scale. The drawings are necessarily diagrammatic and no effort has been made to make them accurately to scale.

As shown in Figures 1 and 2, an electrode made according to a preferred form of my invention may comprise a plurality of fibers or strands 10 matted together into a thin sheet of desired size. The electrode is provided with a suitable terminal 11 made up of the same material as the electrode, although it is to be understood that the foil terminals or other conventional terminal arrangements may be employed; foil terminals, for example, may be welded or stapled to the electrode body, whereas the terminal 11 is merely a continuation of the material of the electrode body. The nature of the material is shown better in Figure 3, although it must be understood that the illustration is necessarily diagrammatic.

As shown in Figure 3, the strands 10 are each made up of a central core portion 12 composed preferably of glass or other suitable material having a melting point high enough to permit the metal sheath 14 to be deposited on them without fusing the strands. These strands, coated with metal so that they become conductive, are matted or felted together as shown with the fibers extending in random directions, and are preferably subjected to heat and pressure after the felting operation so that the metal sheaths are welded or sintered together as at 15 where the strands cross each other. In some instances the metal sheath may be reduced in thickness at the intersections, or there may be no metal between two adjacent strands as shown at 16. It is not necessary that all intersections in the electrode be bonded together, but inasmuch as there are a very large number of intersections in the electrode, many of which are bonded, substantially all of the strands making up the electrode are placed in circuit with each other, and the mat is made conductive throughout. The many intersections of the coatings on the strands insure a highly conductive mat of relatively low resistance even though some of the strands may be broken or end within the mat. While I prefer to employ felted mats as described above, it will be evident that the strands may be woven into a thin, porous fabric which may be used as the electrode.

Electrodes made according to my invention may be produced by various methods. Preferably the glass fibers are made in the usual manner, with average diameters not greater than about 0.0005 inch. For use in electrolytic condensers, a high melting point glass substantially free from iron or lead is preferably employed, such glasses may be composed principally of oxides of silicon, boron, magnesium and aluminum and are resistant to the action of electrolytes over long periods of time. The usual boro-silicate glass fibers, which are readily commercially available, may be used. Quartz glass filaments may also be employed as may filaments composed of high quality flint glass. All of these materials have melting temperatures higher than the melting temperature of aluminum and magnesium which are the preferred metals for electrolytic condenser electrodes.

The filaments are next provided with the required metallic coatings or sheaths. The coatings may be applied in various ways. For example, the filaments may be passed, either singly or in groups, bundles or yarns, through a bath composed of the metal to be coated thereon, the filaments preferably remaining in the bath long enough so that they reach substantially the temperature of the molten metal in the bath. In view of the fineness of the filaments, this requires a very short period of time, and thus the filaments may be moved continuously through the bath at a rapid rate of speed. As the filaments leave the bath, the excess metal is removed, for example, by blowing a blast of non-oxidizing gas over the filaments or by use of an electrostatic field. Also, the excess metal may be scraped off the filaments or removed by centrifugal force. In any event, the filaments or fibers, when cool, are provided with adherent sheaths or casings which are substantially continuous throughout, are quite smooth and substantially impervious and preferably are of a thickness of about 0.0001 inch, the thickness being controllable by varying the temperature of the bath, the length of time that the filaments are immersed therein, and other factors.

The coated filaments are then felted into mats which are preferably compressed to the desired thickness and subjected to heat during the pressing operation, thereby bonding the coated filaments together at their points of intersection. As noted above, the mats may be woven if desired, but this is more expensive than felting.

The mats are then cut to the desired size and shape to provide electrode and terminal assemblies, and may be incorporated in the electrolytic devices in the usual manner. For example, in the production of electrolytic condensers, two such electrode and terminal assemblies may be separated by insulating spacers composed of paper or other suitable material, rolled into cylindrical form and impregnated with a suitable film maintaining electrolyte. Prior to assembly, one or both of the electrodes may be subjected to a conventional electrolytic film-forming operation such as subjecting the mat to electrolysis as an anode in a solution of borax and boric acid until the leakage current is reduced to a desired low value at a voltage above the operating voltage for which the condenser is intended. The completed condenser may be encased in a tube in any conventional manner.

Alternatively, instead of coating the fibers and then felting them, the fibers may be felted together and then subjected to a coating operation, for example, by dipping as described above, or by depositing aluminum or other metallic vapor on the mats in a vacuum, the fibers preferably being heated to assure adherence of the metal sheaths. The coating may also be applied by a high pressure spray of aluminum in a chamber having a non-reactive atmosphere such as described in my application Serial No. 548,023, filed August 4, 1944, now abandoned, the mat preferably being maintained at a temperature at or near the melting point of the metal being deposited, thus insuring good adhesion of the molten metal and the production of substantially continuous sheaths on the filaments. Also, the heat results in the excess coating metal dropping off of the filaments while still in a fluid condition, and thus minimizes the accumulation of coatings of undue thickness and the formation of globules or beads of metal. When the coating is applied to the mats in molten form, the intersections of the filaments are bonded together during the coating operation; when lower temperatures are employed, it is preferable to subject the coated mat to heat and pressure to weld or sinter the intersection as previously described.

The method of depositing metal on the filaments from metallic vapors may also be applied to filaments before they are made into mats, the vapor being deposited either on single filaments or on groups or bundles of several filaments. The vapor may be produced either by boiling the metal, preferably in a vacuum or by vaporizing the metal electrically in a vacuum, methods of this general type being well known and used in the production of mirrors. Other methods for coating separate filaments, groups or bundles of filaments, or mats composed of woven or felted filaments include coating the filaments with metal powder and subsequently fusing the powder to provide the adherent sheath, spraying the filaments or fibers with aluminum in accordance with the Schoop process and thereafter fusing the sprayed particles preferably by passing the coated filaments through a high frequency field, and drawing the filaments through a die filled with molten metal and removing the excess metal by blowing or by centrifugal force.

Where the metal is deposited in a molten state, it is preferable to heat the filaments substantially to the melting point of the metal to secure good adhesion of the sheath metal; for such methods therefor it is desirable to employ filaments composed of material which has a higher melting point than the metal to be coated.

Where relatively low temperatures are employed in the deposition of the metal, as where the metal is deposited from vapor or by the decomposition of a carbonyl as described below, strands such as rayon filaments, cellulosic threads, yarns, filaments or fibers of various sorts and filaments or fibers of synthetic materials having appropriate chemical and physical characteristics may be employed.

In making electrodes for alkaline cells, the difficulties, which would otherwise be encountered with iron and nickel because of their high melting points, may be eliminated by depositing the metals on the fibers either in the form of individual filaments, groups or bundles of filaments, or woven or felted mats, from gaseous carbonyls of nickel or iron, as the case may be. The carbonyl of the coating metal is passed over the filaments to be coated, the filaments being heated by high frequency heating or other appropriate means to a temperature sufficient to cause decomposition of the carbonyl and deposition of the metal on the filaments. The decomposition temperatures of the carbonyls are reasonable and well below the melting temperatures of the glass fibers which I preferably employ, nickel carbonyl $(Ni(CO)_4)$, for example, being decomposed at a temperature of 180° C.

In making both nickel and iron electrodes, the mats of coated filaments are preferably subjected to heat and pressure to bond the contacting portions of the metallic sheaths together in the manner previously described. The electrodes have large active surface areas. Cells may be produced by incorporating one or more iron and one or more nickel electrodes with suitable separators in a conventional alkaline electrolyte, the active material preferably being formed electrolytically in the usual manner. The nature of the electrode is such as to produce cells having low resistance and high capacity with respect to their volume and weight as compared to conventional alkaline cells.

Electrodes made according to my invention have large effective area for a relatively small mass, require comparatively small amounts of metal and may be made economically and rapidly. The completed electrodes are durable and efficient and retain their high qualities for long periods of time because the metallic sheaths on the filaments firmly adhere to the underlying material and are substantially continuous, assuring good conductivity throughout.

Various changes and modifications may be made in my invention without departing from the spirit and scope thereof. Accordingly, it is to be understood that my patent is not limited to the preferred forms described herein or in any manner other than by the scope of the appended claims.

I claim:

1. An electrode for electrolytic devices comprising a felted mat made up of a plurality of glass fibers having an average diameter not greater than about 0.0005 inch, each fiber being substantially entirely sheathed by a smooth thin substantially impervious layer of metal, substantially all of the fibers making up the electrode being in circuit with each other.

2. An electrode according to claim 1, wherein the metal is a film-forming metal.

3. An electrode according to claim 1, wherein the metal is nickel.

4. An electrode according to claim 1, wherein the metal is iron.

5. An electrode for electrolytic condensers comprising a mat made up of a plurality of strands of glass having an average diameter not greater than about 0.0005 inch, each of the strands being substantially entirely sheathed by a substantially impervious layer of aluminum having an average thickness of not greater than about 0.0001 inch, substantially all of the strands in the mat being welded to other strands in the mat and being in circuit with each other.

6. The method of making electrodes for electrolytic devices which includes the steps of providing a mat composed of a large number of filaments of insulating material sheathed in substantially impervious layers of metal, said filaments contacting each other at many places distributed throughout the electrode, and subjecting the mat to heat and pressure to bond the metallic sheaths together where the filaments are in contact.

7. The method according to claim 6, wherein the filaments are first formed into a mat and thereafter sheathed with metal.

8. The method of making electrodes for electrolytic devices which includes the steps of sheathing a plurality of filaments of insulating material with substantially impervious layers of metal, thereafter weaving a mat from said filaments, said filaments contacting each other at many places in the electrode, and subjecting the mat to heat and pressure to bond the metallic sheaths together where the filaments are in contact.

9. The method of making electrodes for electrolytic devices which includes the steps of sheathing a plurality of filaments of insulating material with substantially impervious layers of metal, thereafter felting the filaments into a mat composed of a large number of such filaments, said filaments contacting each other at many places in the electrode, and subjecting the mat to heat and pressure to bond the metallic sheaths together where the filaments are in contact.

10. The method of making electrodes for electrolytic devices which includes the steps of coating glass fibers with finely divided metal particles, and thereafter heating the coated fibers to fuse the metal into substantially continuous impervious sheaths on said fibers.

11. The method of making electrodes for electrolytic devices which includes the steps of providing fine filaments of insulating material, and depositing thin substantially impervious sheaths of metal thereon by disposing the filaments in a vacuum chamber and introducing metallic vapor therein, whereby the metal condenses on the filaments.

12. The method of making electrodes for electrolytic devices which includes the steps of providing fine filaments of insulating material, and depositing thin substantially impervious sheaths of metal thereon by passing a stream of a volatile carbonyl of the metal to be deposited over the filaments in gaseous form, and heating the filaments to a sufficient temperature to decompose the carbonyl, whereby the metal is deposited on the filaments.

13. A storage battery of the alkaline type having an electrode comprising a mat of fine glass filaments having an average diameter not greater than about 0.0005 inch and being coated with thin substantially impervious sheaths of metal, substantially all of the filaments being in circuit with each other.

14. A storage battery according to claim 13, wherein the metal is nickel.

15. A storage battery according to claim 13, wherein the metal is iron.

JOSEPH B. BRENNAN.

REFERENCES CITED

The following references are of record in the file of this patent:

UNITED STATES PATENTS

| Number | Name | Date |
| --- | --- | --- |
| 296,164 | Haid | Apr. 1, 1884 |
| 2,104,018 | Brennan | Jan. 4, 1938 |
| 2,251,913 | Brennan | Aug. 12, 1941 |
| 2,277,687 | Brennan | Mar. 31, 1942 |
| 2,278,161 | Brennan | Mar. 31, 1942 |
| 2,310,932 | Brennan et al. | Feb. 16, 1943 |
| 2,406,345 | Brennan | Aug. 27, 1946 |